United States Patent Office 3,533,898
Patented Oct. 13, 1970

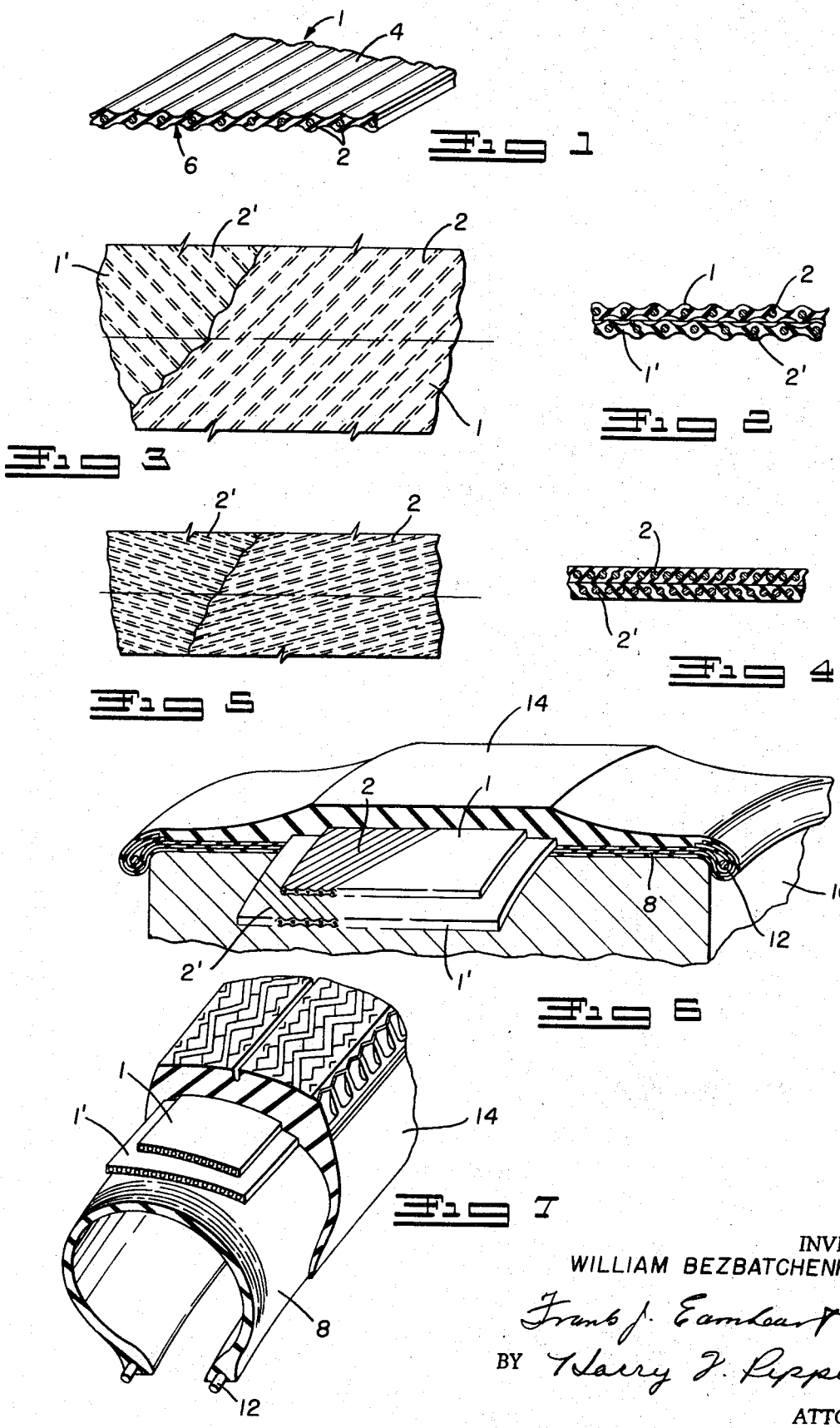

3,533,898
PLY STRIP FOR BELTED RADIAL PLY PNEUMATIC TIRE
William Bezbatchenko, Jr., Cuyahoga Falls, Ohio, assignor to The General Tire & Rubber Company, a corporation of Ohio
Filed July 27, 1967, Ser. No. 658,014
Int. Cl. B60c 9/20
U.S. Cl. 161—123                                   1 Claim

ABSTRACT OF THE DISCLOSURE

The invention provides for the building of a belted radial ply tire in a "one-stage" process wherein the cords of the circumferential belt will "pantograph" to the final desired low crown angle upon expansion.

BACKGROUND OF THE INVENTION

Radial ply tires require circumferential rubberized cord belts primarily to insure their lateral stability during use. While the cords of the carcass plies of such tires extend laterally from bead to bead at substantially a 90° angle to the circumference of the tire, the cords of the required circumferential belts must lie at a smaller angle in relation to the circumference of the tire, usually between 0° and 20°, to insure the above-mentioned stability. This angle is sometimes called the crown angle of the belt. Because of this small angle requirement, radial ply tires cannot be built in the usual "one-stage" flat band method normally used in the building of bias ply tires.

Bias ply tires usually comprise a carcass of a plurality of rubberized cords lying at an acute angle to the circumference of the tire. The carcass plies extend from bead to bead, but their cord angle, i.e., the angle at which they cross the circumferential center line of the tire, is less than 90°. This angle is usually in the range of 45° to 75°. Circumferential breakers are often used between the tread and the carcass to aid in stabilizing the tire in the lateral direction. These breakers are rubberized cord strips wherein the cords usually lie at a relatively large acute angle in relation to the circumferential center line of the tire. This angle is often in the range of 40° to 65°.

Bias ply tires are built according to a "one-step" flat band method. This method comprises wrapping the carcass plies about an expandable drum, fixing the tire beads at the appropriate locations at the ends of the drum, placing the circumferential breaker, or breakers (often times more than one breaker is used) over the carcass plies, at the center of the drum, then positioning the tread stock appropriately in position over the breaker, or breakers, and carcass. This construction is then expanded by the drum to toric shape and represents the final tire configuration. The tire is then cured in a mold.

In a belted radial ply tire, the circumferential belt is relatively inextensible because of the low angle requirement of the belt cords mentioned above. Therefore, the belt will not expand with the carcass when using the aforementioned "one-stage" flat band method. Prior to this invention, radial ply tires have been built in a "two-stage process wherein the circumferential belt and tread stock are separately made according to their final dimensions, transferred to and placed over an expandable drum upon which the carcass of the tire has been built with beads in place, and the carcass is then expanded into contact with the previously built belt and tread.

SUMMARY

It is an object of the present invention to provide a novel circumferential belt for use in a radial ply tire.

It is a further object of this invention to provide a novel circumferential belt for a radial ply tire which permits the building of the tire in a "one-stage" operation.

It is still another object to provide a circumferential belt for a radial ply tire, which is designed to allow the cords of the belt, upon expansion of the belt, to "pantograph" uniformly across the width of the belt from a large acute angle to a smaller acute angle in relation to its circumferential center line.

It has been found that radial ply tires can be built in essentially the same manner as bias ply tires, i.e., in a "one-stage" process, if a specially designed circumferential belt, which forms a part of this invention, is used. The belt is designed so that the cords, which constitute the strength member of the belt, are so embedded in its rubber compound as to permit a cord angle change upon expansion. The cords of the belt, embedded in rubber, are made to initially lie at a larger bias angle than required in the finished tire. The belt, then, when expanded with the carcass will elongate and substantially reduce in width. The cords of the belt under expansion will "pantograph" from their initial larger angle to the desired smaller angle. The number of cords per inch of belt will increase upon expansion.

The belt is designed to allow this "pantographing" by providing that the cords are joined in the spaces between them by a relatively thin layer of rubber. Circumferential belts of this type are usually parallel spaced cords calendered with a rubber compound, wherein the spaces between cords are filled with rubber to a thickness usually equal to, or greater than, the diameter of a cord. The belt to be used in the aforementioned one-stage building process is characterized in that the thickness of the rubber layer in the spaces between the cords is substantially less than the diameter of a cord. The cords of the belt designed in this manner will, upon expansion, uniformly "pantograph" across the width of the belt to a smaller bias angle, because the thin layer of rubber offers little resistance to such movement. The appearance of the belt, before expansion, is corrugated on both surfaces. After expansion, it appears as a normal calendered belt.

BRIEF DESCRIPTION OF THE DRAWINGS

FIG. 1 is a partial perspective view showing the appearance of a belt, before expansion, made according to this invention.

FIG. 2 shows a sectional view of a two-belt combination, before expansion, according to this invention.

FIG. 3 is a fragmentized plan view of the two-belt combination of FIG. 2, shown partially in section.

FIG. 4 is a sectional view of the two-belt combination of FIGS. 2 and 3, after expansion.

FIG. 5 is a fragmentized plan view of the two-belt combination of FIG. 4, partially in section.

FIG. 6 is a partial perspective of an unexpanded tire structure, with parts broken away, built according to this invention.

FIG. 7 shows a partial perspective view of an expanded, completed tire, with parts broken away, built according to this invention.

PREFERRED EMBODIMENTS OF THE INVENTION

In FIG. 1, the belt, shown generally as 1, comprises cords 2 embedded in rubber 4, wherein the thickness of the rubber in the spaces 6 between cords is less than the diameter of a cord 2. The cords 2 can be fiber glass, rayon, nylon, polyester or wire. The thickness of rubber between cords should be around 40% of the diameter of a cord 2. The rubber compound used in the belt can be any of the usual types, for instance, styrene-butadiene, butadiene, or natural rubber. Also, combinations of these types can be used. The belt 1, as can be seen in FIG. 1, has a corrugated surface on both sides.

The cords 2 of the belt 1 should be made to lie at an angle of between 40° and 65° with respect to the longitudinal dimension of the belt. The cords are parallel to each other and are so spaced, along the belt, as to have an "end count" of between 8 and 12 ends per inch.

Many times, a plurality of belts are used as the circumferential stabilizing means in a radial ply tire. Such a plurality is shown in FIGS 2 through 5, wherein two belts 1, 1', like that shown in FIG. 1, are placed one above the other, with the cords 2, 2' of each at the same angle, but lying in opposite directions. FIGS. 2 and 3 depict the belt combination in its unexpanded condition. When expanded, the belts appear as in FIGS. 4 and 5. it is seen that the cords move, or "pantograph," to smaller angle, usually less than 20°. The spacing between the cords becomes less and voids in the spaces 6 created by the initial thin rubber layer, disappear. The belts, as shown in FIG. 4, no longer appear corrugated, but are substantially smooth along both surfaces. The final "end count" of the cords, when the belt is expanded, is between 16 and 24 ends per inch. It is to be noted, that while the length of the belt increases upon expansion, the width of the belts shown in FIGS. 2 and 3 decrease to that shown in FIGS. 4 and 5 when expanded.

One way in which a belt has been made, according to this invention, is to apply a first rubber squeegee of 0.15" gauge on a drum. Cords are then wrapped around the drum on top of the first squeegee. A second squeegee of the same gauge is then applied on top of the cords. A piece is then cut on a bias to form a strip about 12" wide. The strip is then spliced. The cord angle of the spliced strip is 42° and the cord "end count" is 8 ends per inch.

A belt, made in this way, when expanded by a tire building drum, with a radial ply carcass and tread stock, will decrease to a width of 5". The cords in the expanded belt will form a 14° angle with the circumference of the tire with a final "end count" of 16 ends per inch.

FIG. 5 shows an unexpanded, radial ply tire structure built according to the flat band "one-stage" process. Radial carcass plies 8 are placed over the drum 10 with their cords lying along the axis of the drum and the ends overlapping the ends of the drum. Bead rings 12 are placed in position and the ends of the carcass plies are turned over the beads and stitched down according to known procedures. Two circumferential belts 1, 1', constructed as described above, are placed over the plies, around the drum, at the center thereof. Tread and sidewall stock 14 is positioned over the breakers and carcass around the drum. A lubricant, such as zinc stearate, is usually applied between the uppermost carcass ply and its adjacent breaker. Also, the area between the tread and its adjacent breaker may be lubricated. The whole structure is then expanded to toric shape, as represented in FIG. 7, by the expandable drum. The belts 1, 1' will each undergo an increase in length and a decrease in width, while the cords 2, 2' will "pantograph" to the desired smaller crown angle. The expanded tire structure is then cured in a mold.

There are many other variations and modifications which can be made without departing from the scope of the invention which is to be limited only by the appended claim.

What is claimed is:

1. A ply strip for use as an expansible belt in the building of a belted radial ply tire, comprising a plurality of spaced, mutually parallel cords embedded in elastomeric material, said cords being disposed such that said cords lie at an angle of between about 40° to about 60° relative to the longitudinal dimension of said strip and the number of cord ends along an edge of the strip is in the range of about 8 to about 12 ends per inch, wherein the cross-sectional thickness of said elastomeric material in the spaces between the cords is substantially less than a cord diameter, such that each side of said strip is a corrugated surface.

References Cited

UNITED STATES PATENTS

| | | | |
|---|---|---|---|
| 2,541,506 | 2/1951 | Cuthbertson et al. | |
| 2,650,642 | 9/1953 | Reheiser | 152—354 XR |
| 2,930,426 | 3/1960 | Klang et al. | 152—361 |
| 2,982,327 | 5/1961 | Vanzo et al. | 152—361 |

ARTHUR L. LA POINT, Primary Examiner

U.S. Cl. X.R.

152—361